(12) United States Patent
Bombolowsky

(10) Patent No.: US 9,408,072 B2
(45) Date of Patent: *Aug. 2, 2016

(54) OPTIMIZING HANDLING OF FOUND ITEMS THROUGH A MOBILE LOST AND FOUND APPLICATION

(71) Applicant: SAP AG, Walldorf (DE)

(72) Inventor: Jens Bombolowsky, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/712,887

(22) Filed: Dec. 12, 2012

(65) Prior Publication Data
US 2014/0162602 A1 Jun. 12, 2014

(51) Int. Cl.
H04W 12/06 (2009.01)
H04W 12/12 (2009.01)
H04W 4/02 (2009.01)

(52) U.S. Cl.
CPC .............. H04W 12/06 (2013.01); H04W 12/12 (2013.01); H04W 4/028 (2013.01)

(58) Field of Classification Search
CPC ........... H04W 64/00; H04W 4/02; G01S 5/02
USPC ........ 455/404.1, 404.2, 411, 421, 456.1, 456, 455/457
See application file for complete search history.

(56) References Cited

U.S. PATENT DOCUMENTS

| 6,289,200 | B1 * | 9/2001 | Chan ............................. 455/3.01 |
| 6,295,454 | B1 * | 9/2001 | Havinis et al. ............. 455/456.3 |
| 7,756,525 | B1 * | 7/2010 | Thomas et al. ............ 455/456.1 |
| 2005/0237196 | A1 * | 10/2005 | Matsukawa ............ G06Q 10/08 340/572.1 |
| 2011/0061018 | A1 * | 3/2011 | Piratla et al. .................. 715/781 |
| 2012/0315903 | A1 * | 12/2012 | Yoshimura et al. ........ 455/435.1 |

OTHER PUBLICATIONS

"The Internet Lost and Found." URL: < http://www.lostandfound.com/>. Web. Date accessed May 4, 2015. 2 pages. URL: <http://www.lostandfound.com/>.

* cited by examiner

Primary Examiner — Vladimir Magloire
Assistant Examiner — Juan C Perez Tolentino
(74) Attorney, Agent, or Firm — Mintz Levin Cohn Ferris Glovsky and Popeo, P.C.

(57) ABSTRACT

Methods and apparatus, including computer program products, are provided a mobile lost and found application. The method may include tracking, by the user equipment, a plurality of locations of the user equipment, the plurality of locations mapped to a plurality of time values representative of when the user equipment traversed the plurality of locations; determining, by the user equipment, a first location of the user equipment, wherein the determining is based on a first time value received from an interface; authenticating, by the user equipment, at least one of the determined first location and the received first time value; and providing the authenticated at least one of the determined first location and the received first time value to a database searchable based on at least the authenticated at least one of the determined first location and the received first time value. Related systems and articles of manufacture are also disclosed.

12 Claims, 13 Drawing Sheets

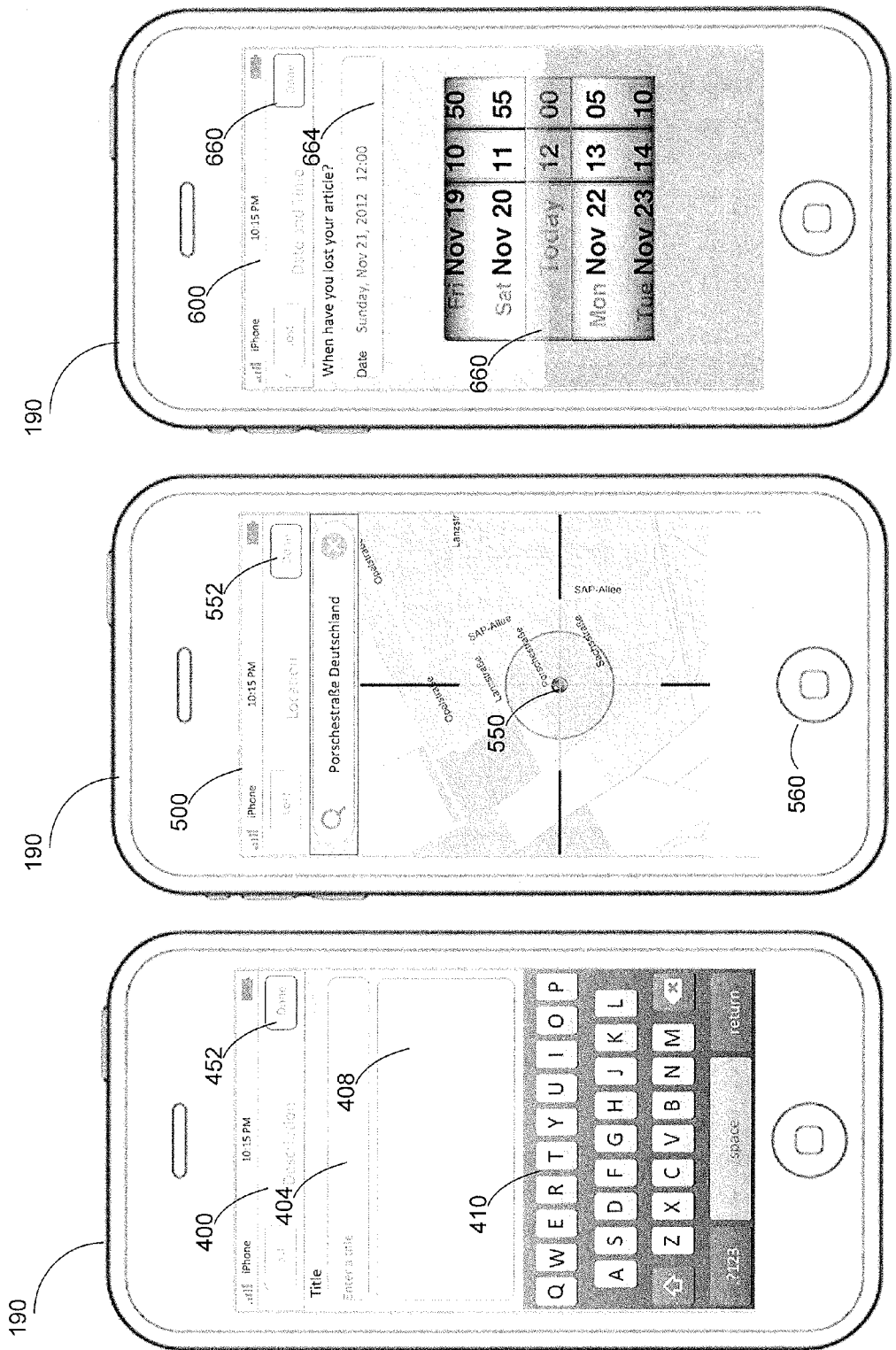

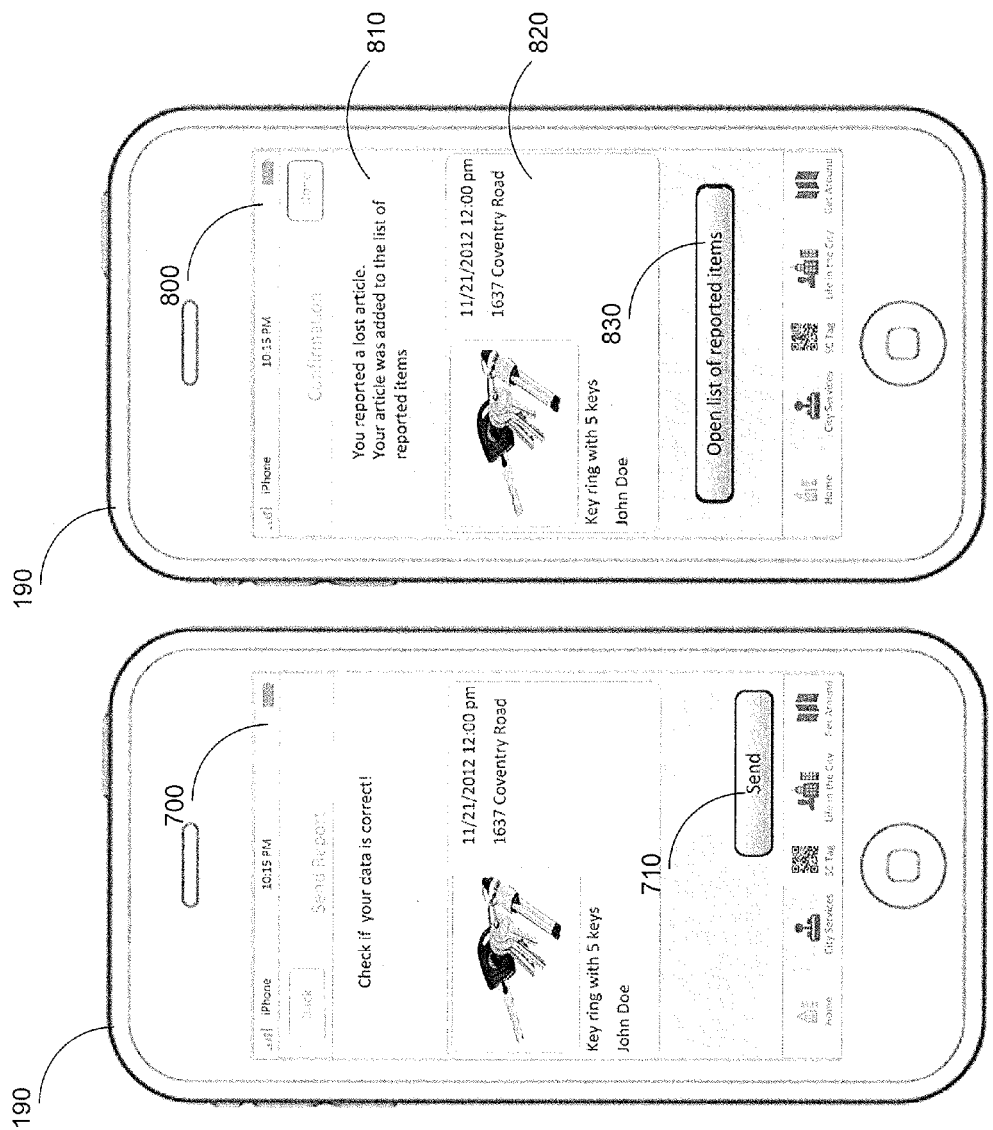

ns and subcombinations of several further features disclosed below in the detailed description.

OPTIMIZING HANDLING OF FOUND ITEMS THROUGH A MOBILE LOST AND FOUND APPLICATION

FIELD

The subject matter described herein generally relates to data processing.

BACKGROUND

Geolocation refers to identifying an actual location of an object on a map, on the Earth, and the like. Thus, geolocation finds the position of the object, and in some instances also finds metadata associated with the position, such as street name and the like. Location based services may use navigation information, such as the Global Positioning System (GPS) and any other navigation and positioning system, to provide precise latitude, longitude, time, altitude, and the like, all of which may be used to geolocate the object.

SUMMARY

In some implementations, methods and apparatus, including computer program products, are provided for a lost and found application.

In some implementations, there is provided a method. The method may include tracking, by the user equipment, a plurality of locations of the user equipment, the plurality of locations mapped to a plurality of time values representative of when the user equipment traversed the plurality of locations; determining, by the user equipment, a first location of the user equipment, wherein the determining is based on a first time value received from an interface; authenticating, by the user equipment, at least one of the determined first location and the received first time value; providing the authenticated at least one of the determined first location and the received first time value to a database searchable based on at least the authenticated at least one of the determined first location and the received first time value; and receiving, at the user equipment, an indication of whether the database includes one or more items matching the at least one of the determined first location and the received first time value.

In some example embodiments, one of more variations may be made as well as described in the detailed description below and/or as described in the following features. The tracking may be enabled based on an indication granting permission to track the plurality of locations. The plurality of locations is received from at least one of a location service or a location processor at the user equipment. The determining the first location may further include determining the first location by determining at least one of the plurality of locations were tracked at the first time value, wherein the first time value is received from the interface comprising a user interface, The authenticating may further include obtaining the plurality of locations automatically from at least one of a location service or a location processor at the user equipment, without allowing a change to the plurality of locations by a user of the user equipment.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combina-

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIGS. 3A, 3B, 3C, 4-8, 9A, 9B, 9C, 10, 11A, 11B, and 11C illustrate examples of pages which may be presented at a user interface used in connection with a lost and found application, in accordance with some example implementations.

DETAILED DESCRIPTION

Figure 1:
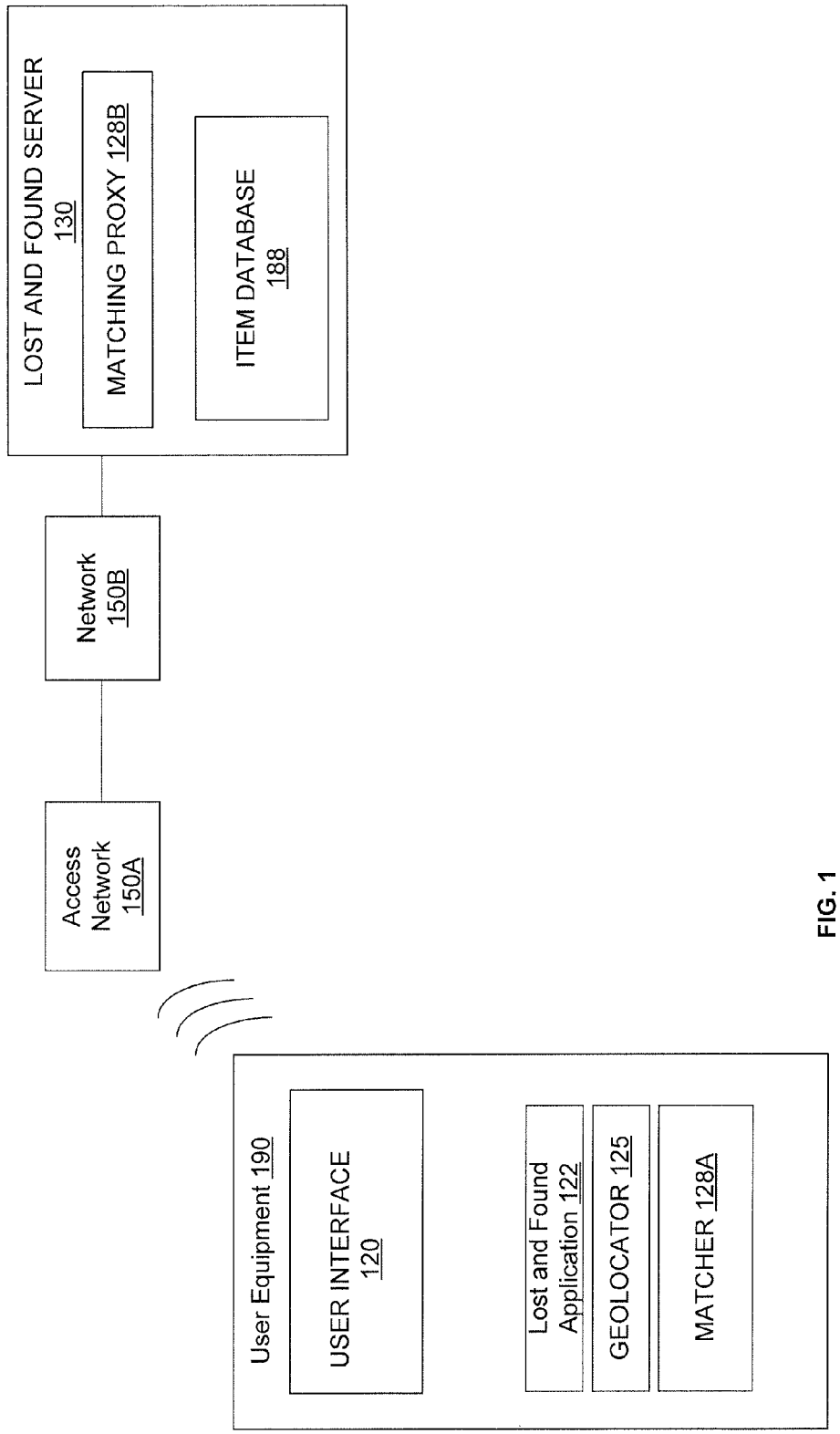
FIG. 1 illustrates a block diagram of an exemplary system including user equipment, in accordance with some example implementations.

FIG. 1 depicts a system 100 including a mobile device, such as user equipment 190. The user equipment 190 may include a user interface 120, a lost and found application 122, a geolocator 125, and a matcher 128A. The user equipment 190 may wirelessly couple to an access network 150A, such as a cellular network, a wireless local area network (e.g., WiFi), and the like. Moreover, the access network 150A may further couple to one or more other networks 150B, such as the Internet. The lost and found server 130 may couple to network 150B and include a matching proxy 128B and an item database 188. The lost and found application 122 may access lost and found server 130 to at least report found items for storage at database 188 and/or report lost items to enable finding the items at database 188.

A lost and found service generally refers to a service that collects lost items for a certain period of time, such as until the item is claimed by an entity losing the item or until the item is disposed of. For example, a person may find an item (also referred to as the "finder") and then give the found item to a lost and found service in the hopes that the person that lost the item (also referred to as the "loser") claims it. Although the underlying aim of lost and found appears relatively straightforward, bring the person that found the item and the person that lost the item is not.

Some online services, such as lostandfound.com, have been implemented to allow a person to search online for a lost item. However, these services have issues, such as unscrupulous people that claim items that they did not lose, incorrectly identifying the location of the item that was lost or found, and the like, making thus the lost and found process difficult in some instances.

The subject matter disclosed herein relates to a mobile lost and found application configured to facilitate a lost and found service. The mobile lost and found application technology may be implemented on user equipment, such as a smart phone, tablet, and the like. For example, the mobile lost and found application may provide user interfaces specifically configured to facilitate lost and found. Moreover, the mobile lost and found application may include a tracking feature to allow programmatic monitoring of location and/or time associated with a user, so that the location/time information can be provided to a lost and found server to search, based on time and/or location, for a lost item. And, the programmatically monitored location and/or time associated with the user may be provided to the lost and found server when reporting a found item. Furthermore, the programmatically monitored location and/or time can be authenticated and/or secured to prevent fraud since the lost and found server directly obtains the user's location from a geolocator, such as a mapping application and/or a location processor at the user equipment. For example, if a loser claims to have lost a watch at a given location but the location processor or mapping service indicates to the lost and found application that the user was nowhere near the location given to the lost and found service, then the loser's claim may be false. In addition, directly obtaining the user's location programmatically from a geolocator at the user equipment may also enhance location accuracy, as the location information is less prone to data entry errors. And, matching may be enhanced as well due in part to a standard location format between the lost and found application and the lost and found server.

In some example embodiments, the user interface 120 may comprise a browser, a smart client, and the like configured to allow a user to provide information and/or receive information related to the lost and found application 122. For example, the user interface 120 may include a touch screen, key board, and/or other mechanisms to allow providing a description of the lost or found item, uploading photos of the lost item, and so forth. Moreover, in the case of a user equipment comprising a camera-ready smart phone, the process of uploading a picture is relatively seamless. In some implementations, rather than use a picture of the actual lost item (e.g., an actual picture of the item before the loss), the user may use a photo of a similar item.

The mobile lost and found application 122 may access the mobile lost and found server 130 to obtain matches. Specifically, the lost and found server 130 may include a database 188 (labeled item database). The database 188 may be configured to allow found items to be added to the database (as well as metadata for the lost item) and to allow searching of those items. Examples of metadata include a description of the item, a time of the loss, a time of the find, a location of the loss, a location of the find, a picture of the lost item, an identity of the finder, an identity of the loser, contact information for the loser, contact information for the finder, and so forth.

In some example implementations, while metadata is being entered at user interface 120, the lost and found application 122 programmatically queries the database 188 without the user having to perform a dedicated search. Moreover, the query of the database 188 may use the location of the lost item, such as latitude and longitude, street name, landmark, and the like). In addition, or alternatively, the mobile lost and found server application may, in some example implementations, query the database based on a time, such as when an item was lost. For example, if a user only knows the approximate time of the loss, the lost and found application 122 may query the lost and found server 130 based on the time. Alternatively, the lost and found application 122 may determine a location for that time (for example, when the location of the user equipment is being tracked over a given period of time) and then provide the corresponding location(s) for that time to the lost and found server 130. Other queries for the items may include item description, nearby landmark where the item was found, and the like. The actual time may be received from the user equipment/device to prevent fraud, as the database search is triggered with data that the user cannot manipulate.

The mobile lost and found server 130 may also generate instructions for a user of the mobile lost and found server application. For example, the mobile lost and found server 130 may generate a page, such as a hypertext markup language page and the like, providing instructions to a user of the lost and found application. The instructions may describe what to do with the lost item, such as whether the finder should leave the item, take the item home, or take the item to a certain location. Further, since the mobile lost and found server 130 may programmatically obtain the location of the user reporting the found item by accessing the geolocator 125, the instructions may be configured specifically for the location, such as a specific lost and found location where a found item can be deposited.

Furthermore, the mobile lost and found application 122 may generate user interfaces that require the person finding a lost item to provide structured and specific metadata to facilitate matching. For example, mobile lost and found application 122 specific may include a drop down menu for time so that all users provide time in the same format, facilitating matching at lost and found server 130 when compared to disparate time formats.

In some example implementations, while a user enters metadata/description of the lost item, potential matches may be programmatically returned. For example, as a user enters a location, the mobile lost and found application may generate a query to the database and allow presentation of potential matches when the user enters the metadata/description (for example, after the user has entered the description or has uploaded a picture). As such, the user is not performing a direct search of the database 188 but instead is provided with matches. For example, the user interface at FIG. 3B shows that in some implementations, a user does not perform a detailed search on the database but instead is only provided with potential matches when relevant data is entered at 320, 322, and the like. Moreover, in some implementations, a match may not be returned unless all of the items are entered at 320-328.

The lost and found application 122 may comprise code, which when executed by at least one processor provides the operations disclosed herein with respect to the lost and found application 122. In some implementations, the lost and found application 122 may be downloaded from a website. The lost and found application 122 may also be coupled to geolocator 125 to obtain location information.

The geolocator 125 may, in some example implementations, be configured to record the position of the user equipment 190. For example, the geolocator 125 may receive from a location processor, such as a global positioning system processor at the user equipment 190, the location of the user equipment 190 at one or more instances of time. In some example implementations, the geolocator 125 may be activated and track the user equipment's location at one or more times to provide a record of the user's location. Accordingly, for any given time, the location of the user equipment 190 may also be determined based on the tracked location/time information recorded at the user equipment 190. In some example implementations, the position of the potential loss may also be entered using geolocator 125 (e.g., an integrated map service and/or a location processor of the user equipment itself). When this is the case, the lost and found application 122 may authenticate the user's location to the lost and found server 130. In contrast, if a user provides the location that has not been tracked by the geolocator 125, lost and found application 122 may indicate to the lost and found server 130 that the location may not be authentic.

In some implementations, matcher 128A may obtain location and/or time information from the geolocator 125 and forward the obtained information to matching proxy 128B, which is further described below. The matcher 128A may also receive matching search results from matching proxy 128B and item database 188, and may also generate pages for presentation at the user interface 120. For example, the matcher 128A may be used to access matching proxy 128B at lost and found server 130. If a user wants to identify an item stored at item database 188 based on location information and/or time recorded by geolocator 125, matcher 128A may provide the location information and/or time to lost and found server 130, so that matching proxy 128B can query items database 188 for items that have location and/or time information matching the user equipment's recorded information.

In some implementations, the matcher 128A may, as noted, provide to matching proxy 128B one or more time values instead of, or in addition to, the location information. These time values may represent time stamps recording the times at which the location measurements are made, or received, for the locations of the user equipment 190.

Figure 2:
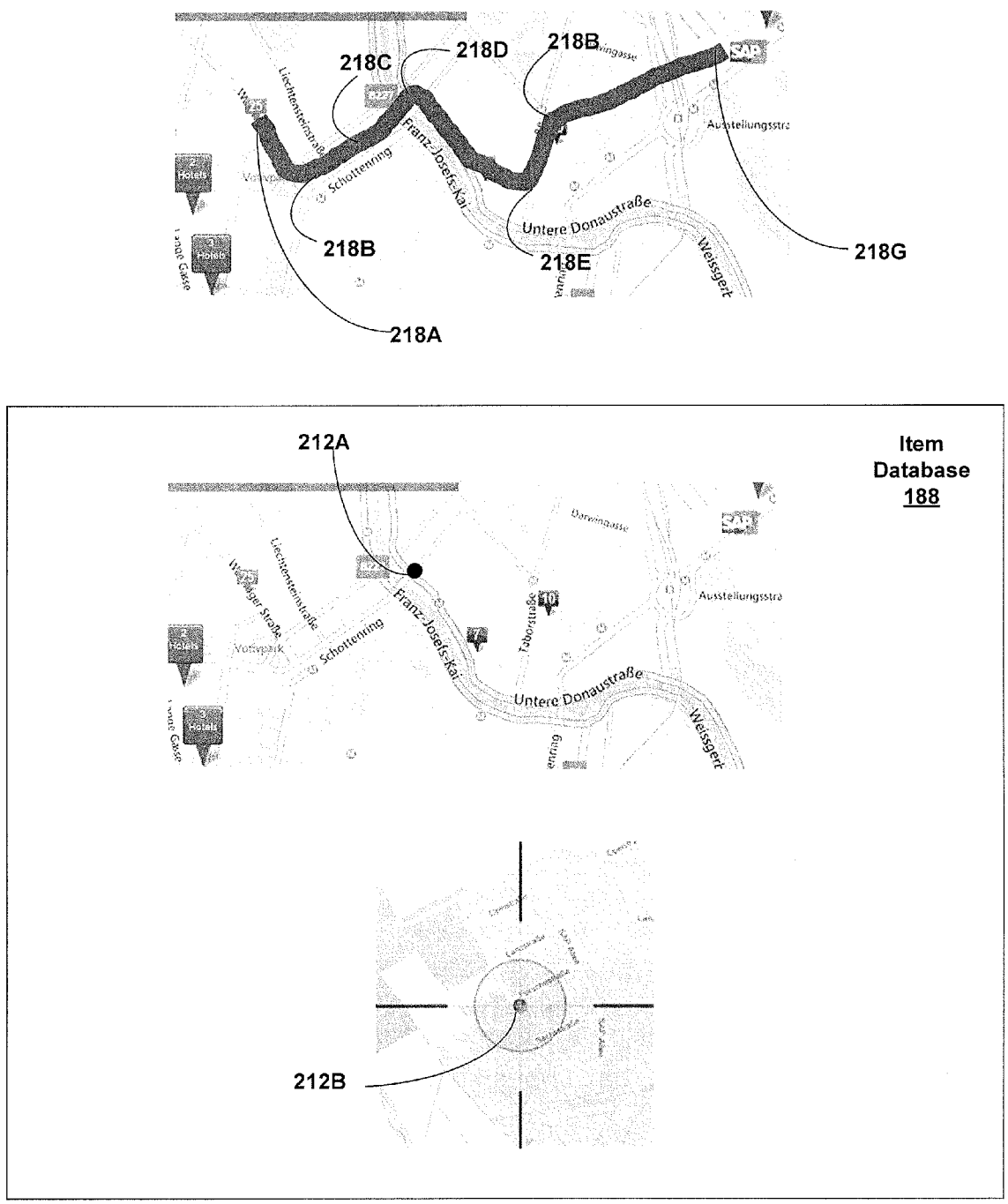
FIG. 2 illustrates examples of location information, in accordance with some example implementations.

FIG. 2 described further below depicts examples of locations of user equipment 190 tracked and thus recorded over a timeframe as the user equipment 190 moves from position 218A to 218G. The geolocator 125 may periodically record the user equipment's location at 218A-G and each time the location is recorded a time value, such as a time of day and date may be recorded. In some implementations, the location information 218A-G and corresponding time may be stored as a path from location 218A through 218G. In this example, matcher 128A may provide to matching proxy 128B the user equipment's 190 recorded location, such as latitude, longitude, and the like, at locations 218A-G (as well as location between 218G).

Once received, the matching proxy 128B may access the item database 188 to query for one or more items stored in the item database 188. The query may be based on one or more of the location information received from the user equipment and the corresponding times for the location information. For example, the item database 188 may include a first item having a single point location 212A, a second item having another single point location 212B, and so forth. In this example, matcher 128A may provide to matching proxy 128B the user equipment's 190 recorded location (which may also include one or more time values for the locations) as a path from location 218A-218G. The matching proxy 128B may then query for items stored in item database 188 that match location 218A-218G, and identify item 212A as a match since the user equipment's 190 path from location 218A-218G is the same, or similar to, the location 212A. Moreover, the matching may include a search based on time values. For example, the location 218A-218G may represent the location of the user equipment on Aug. 1, 2012, at one or more times between 0600 and 0630 hours and, as such, matching proxy 128B may, in this example, search for items in item database based on one or more of the following: the locations 218A-G; a date, such as Aug. 1, 2012; and/or a time, such as 0600-0630 hours (e.g., items in database 188 with a time values the same, before, and/or after 0600-630 hours on Aug. 1, 2012). Although FIG. 3B depicts the use of street and day of loss to identify a lost item, a timeframe and an area may be used instead.

The lost and found server 130 may comprise at least one processor and at least one memory configured to allow reporting of found items from mobile lost and found application 122 and finding those items to allow a loser to claim the item. Lost and found server 130 may, in some implementations, provide a lost and found service. In this example, item database 188 may include found items reported and stored at items database 188 to allow users that have lost an item to query the item database 188. So if a user/finder finds an item, the user/finder may access lost and found server 130 via network 150B and provide to item database 188 the location of where the item was found and/or a time (or period) when the item was found. Likewise, when a user loses an item, the user/loser may access lost and found server 130 via network 150B and provide the location of where the item was lost and/or a time (or period) when the item was lost to enable a finding matching items in item database 188.

In some example implementations, items may be found at lost and found lost server 130 based primarily on time. For example, if a user knows only the general time frame, the user may provide the time frame at user interface 120, which allows geolocator 125 to determine the location of the user at the provided time. Referring to the previous example, if the user enters at user interface 120 a date and time, such as Aug. 1, 2012, between 0600 and 0630, the geolocator 125 may provide location information corresponding to locations 218A-G. This location information 218A-G and/or the time information may be sent to the matcher 128A and matching proxy 128B to allow formation of a query of item database 188 for found items stored at item database.

When the matching proxy 128B receives the location information and/or time information, the matching proxy 128B may then query the item database 188 including one or more lost items stored therein based on the received location information and/or time information. For example, the query may determine possible lost items stored in item database based on matching location and time, so that possible location matches exclude found items recorded in the item database which were found before the lost item was lost (as indicated by the time values of the lost and found items). In this example, the matching proxy 128B searches for found items in items database 188 having the same or similar locations as the lost item stored in items database 188 (e.g., when the locations match) and/or based on time (e.g., based on the time the item was lost and the time the item was found). If there is at least one match, matching proxy 128B may send matching item(s) to user equipment 190 (including matcher 128A), where the user interface 120 presents information representative of the matching item(s).

Although the previous example refers to several locations 218A-G forming a path, the location information for the user's lost item may comprise a single point location (e.g., from geolocator 125) or a more general location (e.g., a street name, an intersection, a place of interest, and the like), and this location information may also be associated with one or more time values indicating when the user equipment 190 was at a given location (or, e.g., when the location information was received at, and/or recorded by, the user equipment 190 including the geolocator 125). Moreover, the geolocator 125 may, in some implementations, be configured to provide resolution that is equivalent to the resolution being used at the service, such as item database 188.

In some implementations, the geolocator 125 may be configured to run in a background mode to programmatically capture location information and time values as the user equipment moves. As such, when the user of user equipment 190 loses an item, the user can just enter a time range in user interface 120, which forwards the time to matcher 128A to access geolocator 125 to programmatically identify one or more locations where the user/user equipment were located at the given time. These one or more locations may be provided, as noted, to matching proxy 128B to search for items in item database 188 or even log the location of an item. In the lost and found service example, a user finding an item may provide the location and/or time associated with the found item, while a user that has lost an item provides locations and/or times associated with the lost item.

In some implementations, the geolocator 125 may programmatically capture location information and provided the information to lost and found server 130 including matching proxy 128B, where the location information, time, and user identity can be stored. In such implementations, when the user of user equipment 190 loses an item, the user may enter a time range in user interface 120, which forwards the time to lost and found server 130 including matching proxy 128B to programmatically identify one or more locations where the user/user equipment was located at the given time and generate a query, based on time and/or location of item database 188.

Figure 3A:
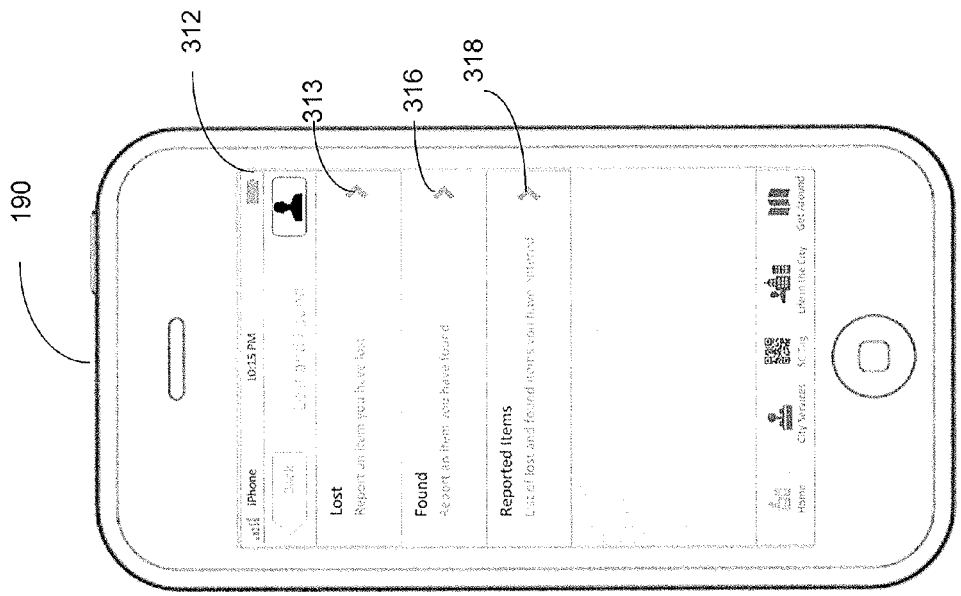
Figure 3B:
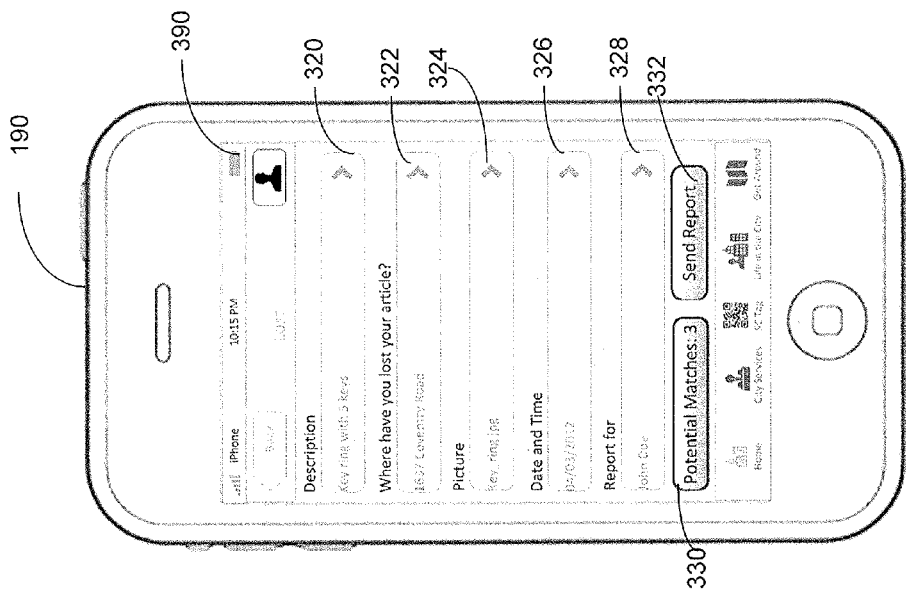

FIG. 3A depicts an example of user equipment 190 including a page 312, which may be presented at user interface 120. Page 312 includes a user interface element 313 which when selected, allows a user interface to provide information regarding a lost item to matcher 128A and matching proxy 128B via a second page 390 (described further below). This information may enable a search for lost items stored at items database 188. In some implementations, matching items may be returned only when all items 320-328 are provided, which may reduce fraud, although matching items may be returned with one or more information elements 320-328 as well. Page 312 also includes a user interface element 316 which when selected, allows a user interface via another page to provide information regarding a found item to matcher 128A and matching proxy 128B. For example, if someone found an item that does not belong to them, that person may want to report the found item by selecting 316, while someone that has lost an item may seek the item by selecting 313. Page 312 also includes a user interface element 318 which when selected, generates a list of one or more lost items stored at item database 188.

FIG. 3B depicts an example of user equipment 190 including a page 390, which may be presented at user interface 120. Page 390 may be presented after a user selects user interface element 313 depicted at FIG. 3A. When 313 is selected, user interface 120 may present page 390, so that a person reporting the loss may provide one or more of the following: a description of the list item 320, where the item was lost 322, a picture of the lost item 324, a date and time of the loss 326, and the person reporting the loss 328. In some implementations, the matcher 128A may obtain stored location information for the user based on the date and time 326, and then provide the location(s) for the date and time 326 to matching proxy 128B for storage and/or search of item database 188. The matcher 128A may also provide one or more of the information 320-328 to matching proxy 128B to facilitate the query of the item database 188.

Page 390 also includes an icon 330 representative of potential matches, which in this example is "3." The potential matches may be provided by item database 188 to matching proxy 128B. In any case, when icon 330 is selected, the potential matches may be presented at user interface 120 as a different page. When the user selects the send icon 332, one or more of the information 320-328 and the location obtained from the geolocator 125 for the relevant time period at 326 (which in this example is 04/03/2012) may be forwarded to matching proxy 128B to facilitate storage and or searching of item database 188.

Figure 3C:
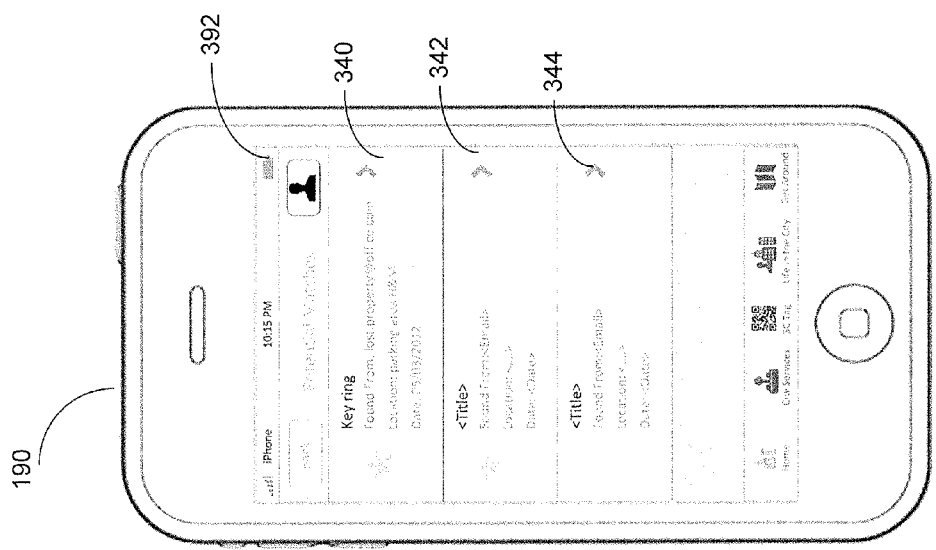

FIG. 3C depicts an example of user equipment 190 including a page 392 presented at user interface 120. Page 392 may be presented after the matching proxy 128B provides one or more matching items identified based on location and/or time to user equipment 190 and matcher 128A. Page 392 may be presented after the potential matches icon 330 is presented.

FIG. 4 depicts an example of user equipment 190 including a page 400 presented at user interface 120. When a user attempts to enter a description at 320 (FIG. 3B), a title 404 for a lost item may be entered via keyboard 410 and a detailed description may be entered at 408. For example, the title may comprise "Lost Watch" with a detailed description saying "gold Rolex watch with engraving on back bezel." When the user is done entering a description, the user may select done 452, which may return the user to page 390 at FIG. 3B. As shown at FIG. 3B, potential matches are shown at 330 while the user enters the metadata for the item.

FIG. 5 depicts an example of user equipment 190 including a page 500 presented at user interface 120. When a user attempts to enter a location at 322 (FIG. 3B), page 500 may be presented to allow a user to provide a location via a mapping service at the user equipment. For example, the user may select a location, such as location 550, via the mapping service. And, this location may be provided as the location at 322. The user may move a user interface mechanism, such as 560, although other input mechanisms may be used as well, such as a touch screen. The use of a consistent mapping interface (e.g., 550) may facilitate a standard and structured format for date and/or time. When the user is done entering a location, the user may select done 552, which may return the user to page 390 at FIG. 3B. As shown at FIG. 3B, potential matches are shown at 330 while the user enters the metadata for the item.

FIG. 6 depicts an example of user equipment 190 including a page 600 presented at user interface 120. When a user attempts to enter a data and time at 326 (FIG. 3B), page 600 may be presented to allow a user to provide a data and time. For example, the user may enter the data and time using the wheel-based element 660, although direct textual entry may be performed at 664 as well. The wheel-based element 660 may facilitate a standard and structured format for date and/or time. When the user is done entering a location, the user may select done 660, which may return the user to page 390 at FIG. 3B. As shown at FIG. 3B, potential matches are shown at 330 while the user enters the metadata for the item (or after the user has entered the metadata, based on the configuration settings as noted above).

In some example implementations, when send report is selected at 332, a page 700 is generated as depicted at FIG. 7. The page 700 provides a summary of the metadata associated with the lost item to allow a user to review the lost item metadata for accuracy before selecting send 710, which sends the lost item metadata to lost and found server 130.

In some example implementations, when a lost and found report is sent (e.g., at 332 (FIG. 3B) or 710 (FIG. 7) to lost and found server 130, a page 800 is generated as depicted at FIG. 8. The page 800 provides an acknowledgement 810 from lost and found server 130 and a summary 820 of the metadata associated with the lost item report. Page 800 may also include a user interface element 830, which when selected generates a list of items reported as lost.

In some example implementation, the lost and found server 130 may allow alerts of possible matches to be sent to the user that lost the item. For example, the user finding a lost item and/or lost and found server 130 may send a message to the user that lost an item.

Figure 9A:
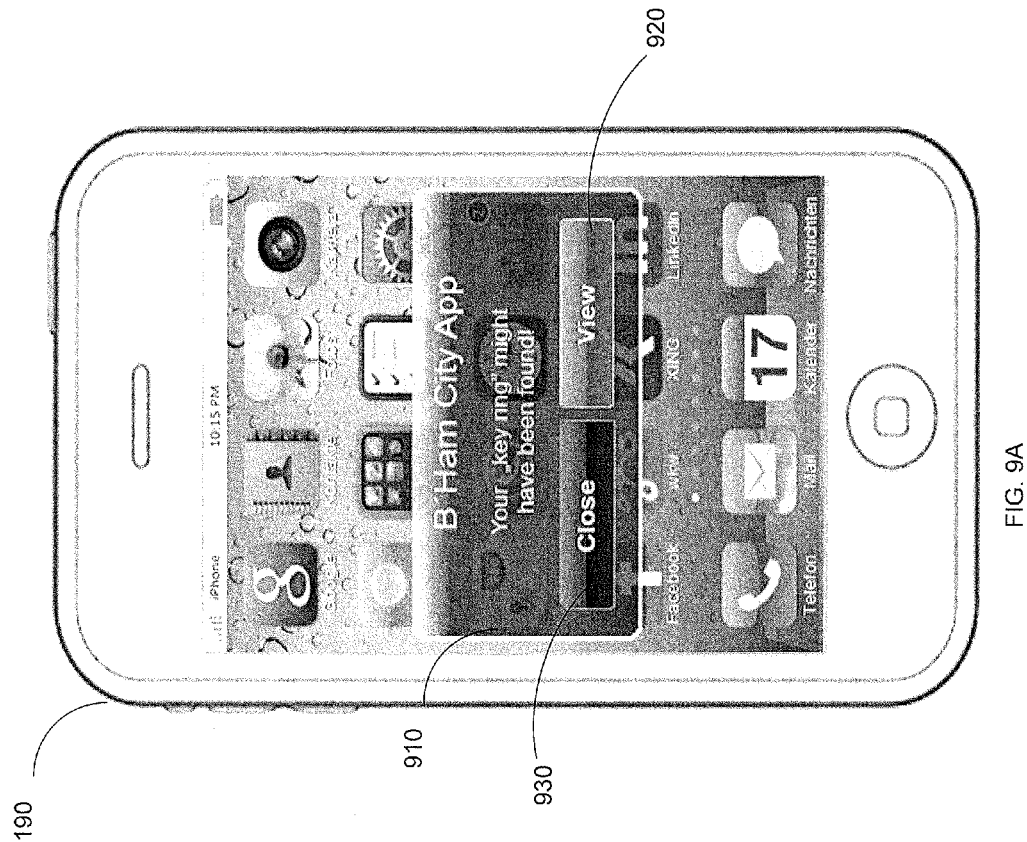

FIG. 9A depicts an example of an alert 910 indicating that a candidate lost item may have been found. When a user selects user element 920, a page is presented with details regarding the possible match. If the user does not want to see the details, the user may instead select the close 930 user element.

Figure 9B:
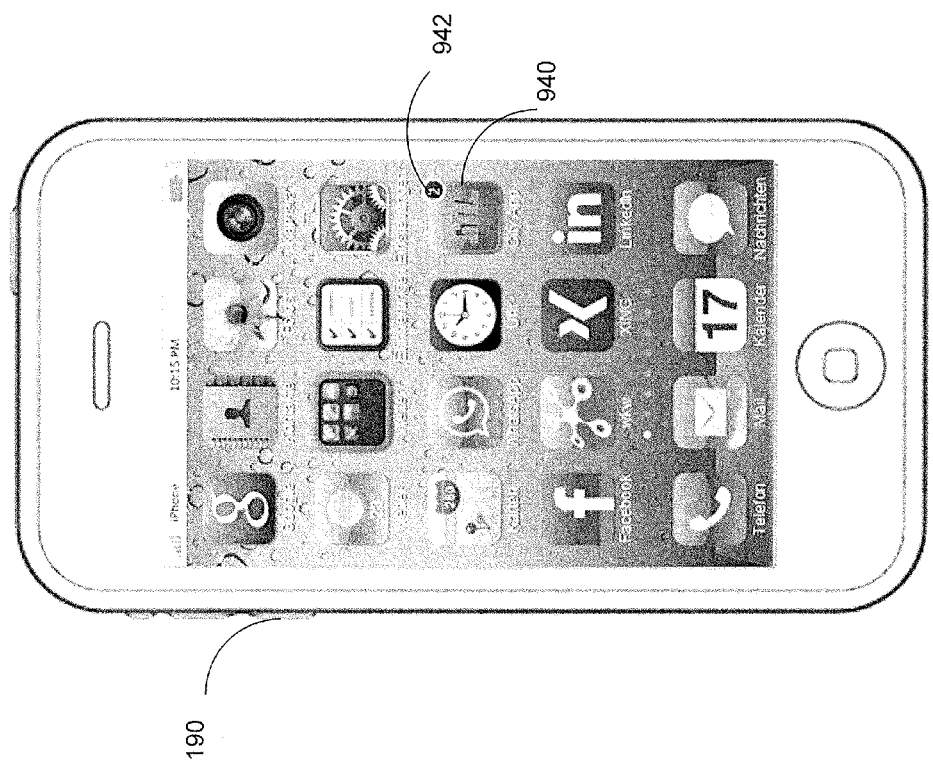
Figure 9C:
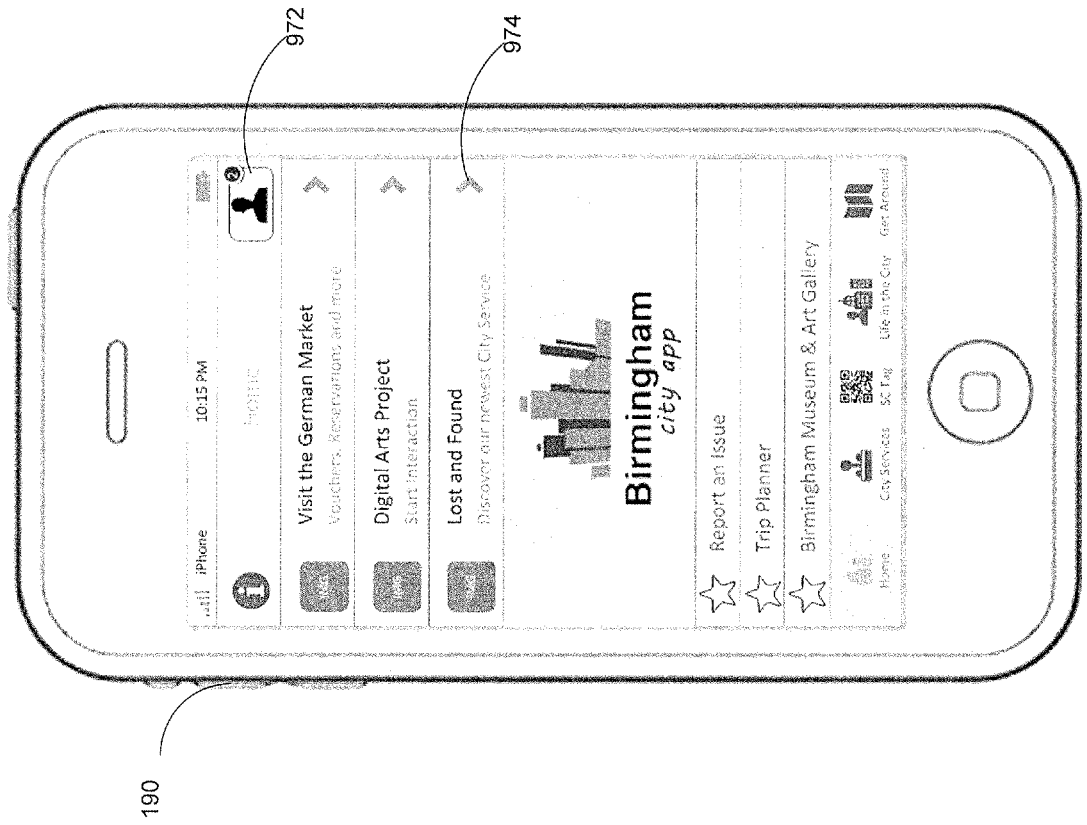

FIG. 9B depicts the lost and found application 940 including an indication of two pending messages 942 to alert the user that there might be possible matches for the lost item. If a user selects the lost and found application 940, the user equipment 190 may launch the lost and found application as depicted at FIG. 9C at 974. FIG. 9C also shows that the user may be presented with an indication that there might be two matches for the lost item as indicated by the "2" at 972.

Figure 10:
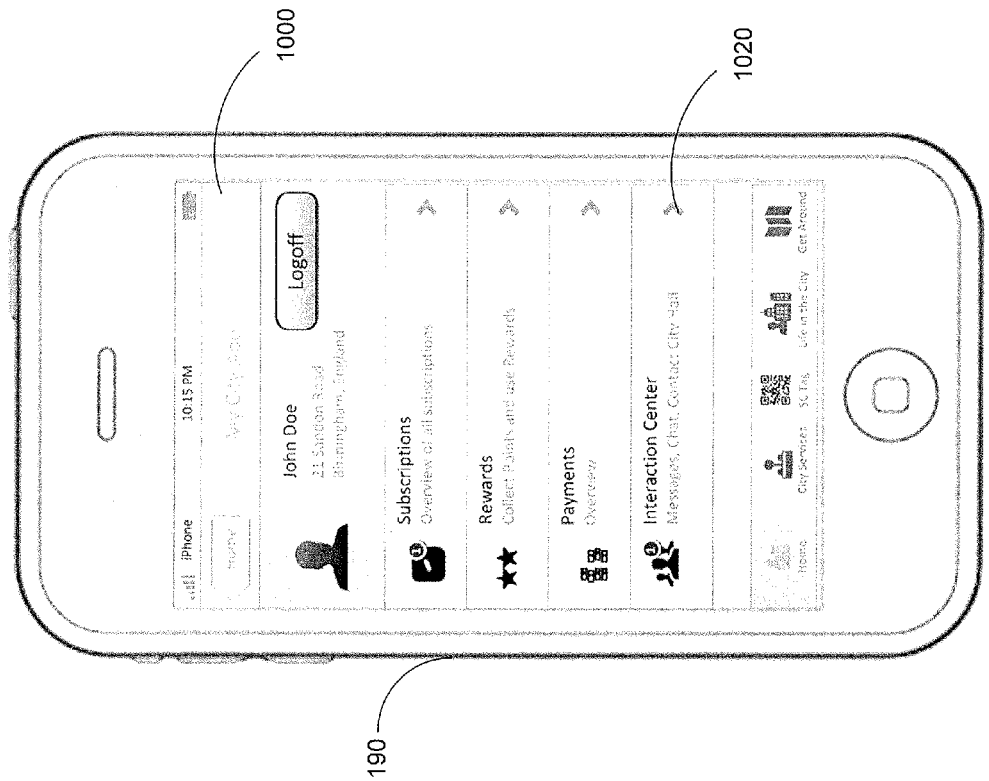

When the user decides to view the messages indicating potential matches for the lost item, the user may select 972, which may generate page 1000 including a message (or interaction) center 1020 as depicted at FIG. 10.

Figure 11:
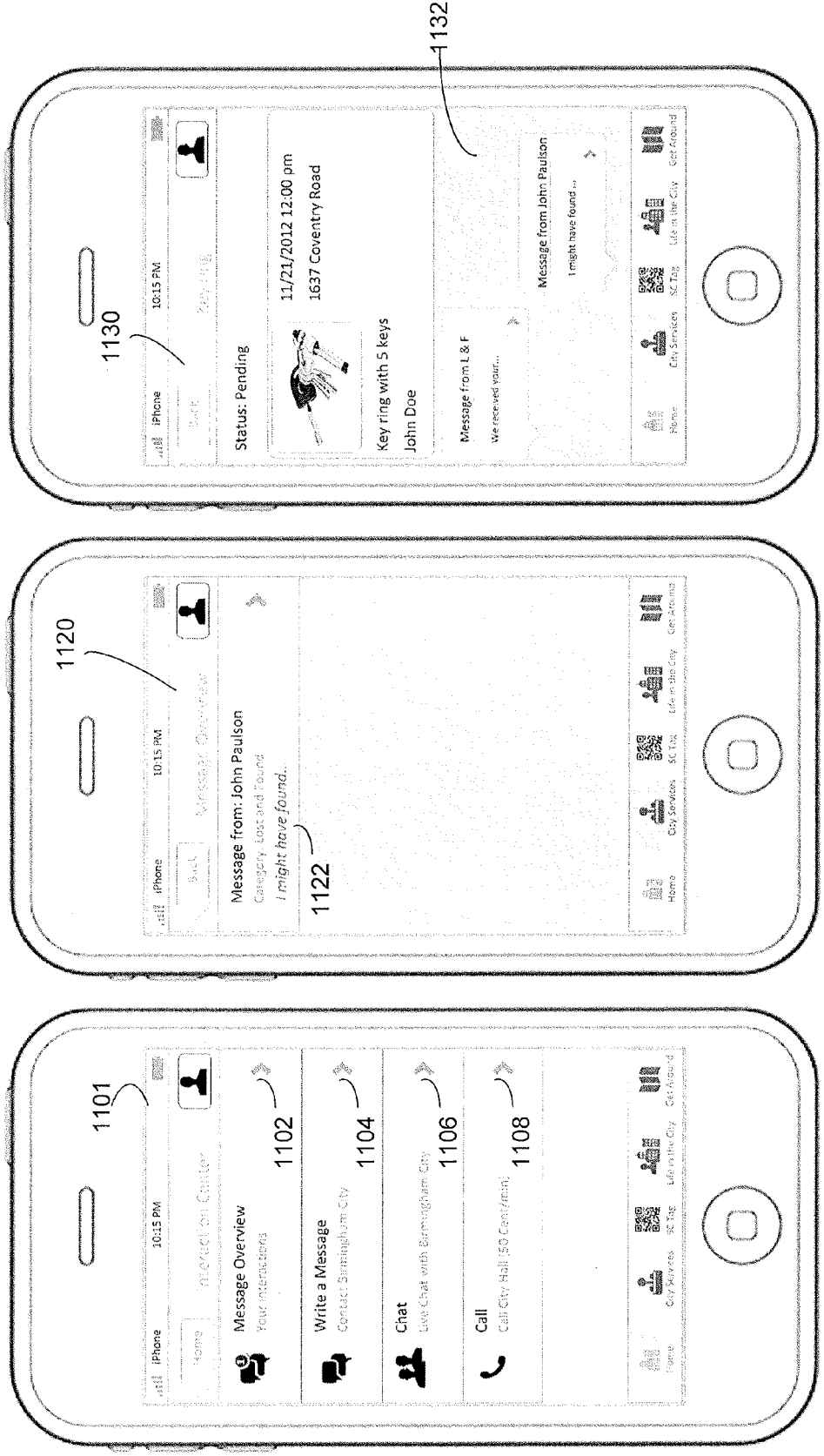

Selecting 1020 may also result in page 1101 at FIG. 11A to be presented at the user equipment 190. Page 1101 may allow reading messages from a finder of the lost item 1102, writing messages to a finder of the lost item 1104, chatting via text with the finder of the lost item 1106, and/or calling the finder of the lost item 1108.

FIG. 11B depicts page 1120 triggered when 1102 is selected. Page 1120 includes a message 1122 from the sender providing details of the lost item.

FIG. 11C depicts page 1130 triggered when 1104 is selected. Page 1130 includes a chat session 1132 between the owner of the lost item and the person finding the item 1132, as well as a summary of the lost item, and a status of the loss (pending).

Figure 12:
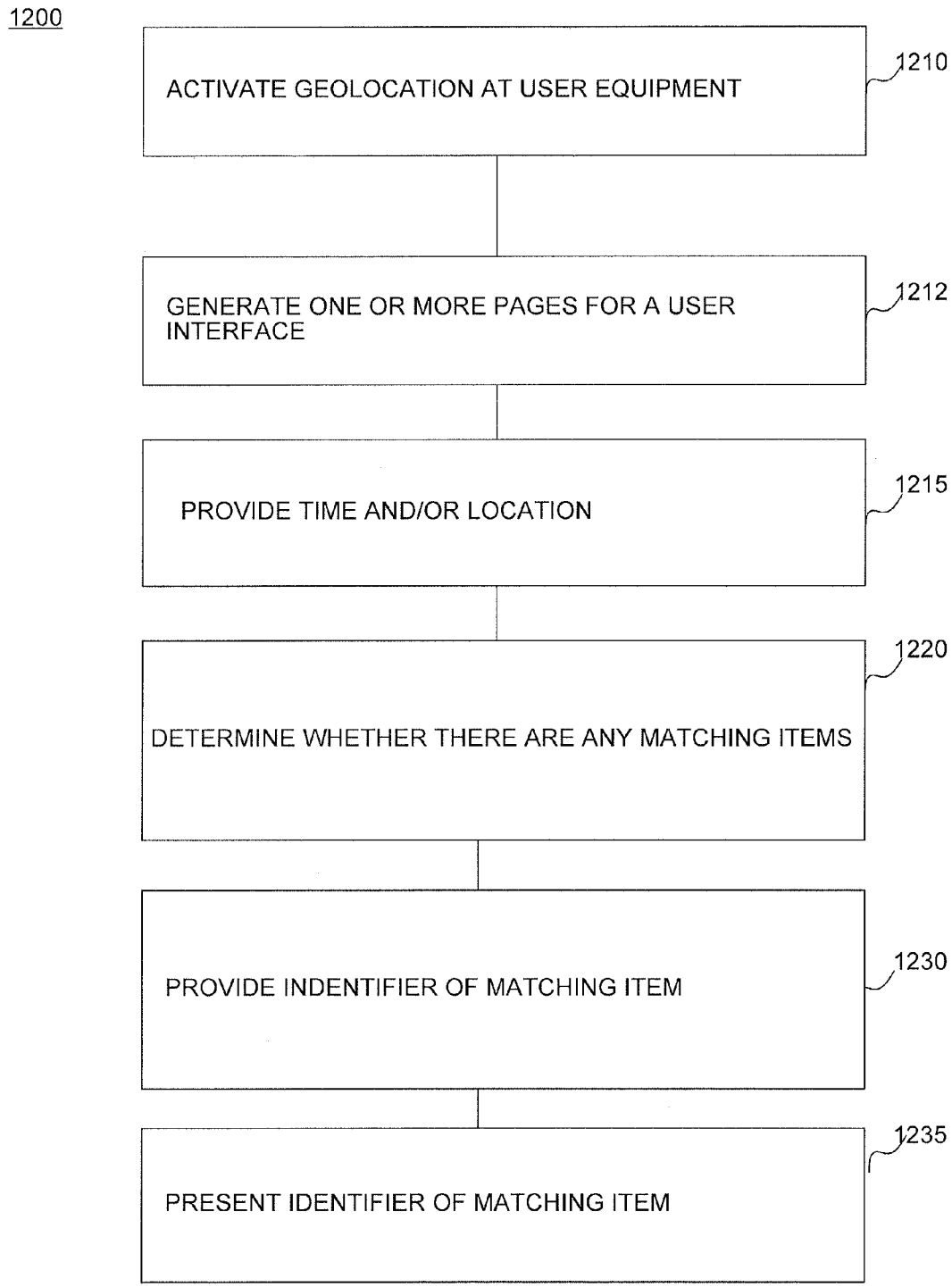
FIG. 12 illustrates a process for providing a mobile lost and found application, in accordance with some example implementations.

FIG. 12 depicts a process 1200 for a lost and found application, in accordance with some example implementations.

At 1210, geolocation at the user equipment may be activated. For example, a user may activate geolocator 125, so that it records location information for user equipment 190. Moreover, the location information may be recorded programmatically and the recorded information may be associated with time values, so that a time of day may identify a location of the user equipment (or a time frame may identify locations). In some implementations, the user equipment 190 may be required to opt-in by acknowledging activation of the tracking performed by geolocator 125 and/or by registering at lost and found server 130 to opt-in to the tracking performed at system 100. In some implementations, the user equipment 190 may "authenticate" the location provided to lost and found server 130 by including an indication that the location provided to location server 130 was provided programmatically via geolocator 125 and/or a mapping service, rather than a specific user input value.

At 1212, one or more pages may be generated to allow a user at user equipment 190 to provide metadata describing a found and/or a lost item. For example, one or more of pages, such as the pages at FIGS. 3A, 3B, 3C, 4-8, 9A, 9B, 9C, 10, 11A, 11B, and 11C, may be generated.

When a user enters metadata into one or more pages, the metadata including time information, location information, and/or the like may be provided, at 1215, to lost and found server 130 to enable an identification of one or more matches. For example, a user may provide to user interface 120 a time 326 at page 390. The matcher 128A may then receive the provided time and retrieve, based on the provided time, one or more locations recorded at geolocator for user equipment 190. The time and/or location may then be forwarded by the matcher 128A to the matching proxy 128B to initiate a search of item database 188. Moreover, the time information and/or location information may be authenticated as noted above to ensure the veracity of the information.

At 1220, the matching proxy 128B may determine whether there are any matching items by querying items database for items that match at least one of the time and/or location forwarded at 415. For example, matching proxy 128B may query items database 188 for items that match one or more locations (or geo code for those locations), such as locations associated with path 218A-218G. Moreover, matching proxy 128B may query items database 188 for items based on time. For example, the path 218A-218G may have been traversed on Aug. 7, 2012, so matching database 188 may disregard items reported found before the time the item was lost.

At 1230, the matching application 188 may provide identifiers for any items identified as possible matches to at least one of the time and/or location forwarded at 1215. Next, the user interface may present, at 1235, the matching item(s) on, for example, page 392 at user interface 120.

Referring again to FIG. 1, the user equipment 190 may be implemented as a mobile device, although it may be stationary as well. The user equipment 190 may be referred to as, for example, a mobile station, a mobile unit, a wireless terminal, a tablet, a smart phone, or the like. In some implementations, user equipment 190 may include a processor, a computer-readable storage medium (e.g., memory, storage, and the like), a radio access mechanism configured to couple to a wireless network, and/or a user interface. Moreover, the storage medium may include instructions, such as code, which when executed provides user interface 120, matcher 128A, and geolocator 125.

The lost and found server 130 may include one or more processors, such as computers, to interface with other processors, such as user equipment 190. The lost and found server 130 may also include a computer-readable storage medium (e.g., memory, storage, and the like) including instructions, such as code, which when executed provides the matching proxy 128B and/or item database 188. In some implementations, the lost and found server 130 is coupled to networks 150A-B.

The access network 150A may include one or more of a cellular network, a public land mobile network, a wireless local area network, such as a WiFi network, and the like. For example, the access network 150A may include one or more wireless links to a wireless access point, such as a cellular base station or a WiFi access point. The wireless access point may be further coupled to other networks, including the Internet, other wired networks, and/or any other network. In some exemplary implementations, user equipment 190 is a mobile device accessing wireless access network 150A via a cellular base station and/or WiFi wireless local area network access point. In this example, the cellular base station and/or WiFi wireless local area network access point may be coupled to other networks including wired and/or wireless networks, some of which may include the Internet, coupled to lost and found server 130.

Although FIG. 1 shows a single user equipment 190, a single access network 150A, a single network 150B, and a single server system 130, other quantities and configurations of user equipment, networks, and servers (as well as the components therein) may be used as well.

Although some of the examples described herein refer to the position information comprising global positioning system location information, any other type and/or source of location information may be used as well.

Although some of the examples described herein refer to a lost and found service, other services may be provided utilizing location and/or time information to identify items in a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   tracking, by a user equipment, a plurality of locations of the user equipment, the plurality of locations mapped to a plurality of time values representative of when the user equipment traversed the plurality of locations;
   determining, by the user equipment, a path comprising the plurality of locations of the user equipment, wherein the determining is based on a range of time values received from a user interface, wherein the range of time values represent an estimated range of times of when an item was lost;
   authenticating, by the user equipment, at least one of the path and the range of time values, wherein the at least one of path and the range of time values are authenticated when obtained directly from a location processor at the user equipment, without allowing a change to the at least one of the path and the range of time values by a user of the user equipment;
   providing the authenticated at least one of the path and the range of time values to a lost and found server including a database searchable based on at least the authenticated at least one of the path and the range of time values; and
   receiving, at the user equipment, an indication sent by the lost and found server, the indication representative of whether the database includes one or more lost and found items matching the at least one of the path and the range of time values.

2. The method of claim 1, wherein the tracking is enabled based on an indication granting permission to track the plurality of locations.

3. The method of claim 1, wherein the plurality of locations is received from at least one of a location service or the location processor at the user equipment.

4. The method of claim 1, wherein the authenticating further comprises:
   obtaining the plurality of locations automatically from the location processor at the user equipment, without allowing a change to the plurality of locations by a user of the user equipment.

5. A non-transitory computer-readable medium including code which when executed by at least one processor provides operations comprising:
   tracking, by a user equipment, a plurality of locations of the user equipment, the plurality of locations mapped to a plurality of time values representative of when the user equipment traversed the plurality of locations;
   determining, by the user equipment, a path comprising the plurality of locations of the user equipment, wherein the determining is based on a range of time values received from a user interface, wherein the range of time values represent an estimated range of times of when an item was lost;

authenticating, by the user equipment, at least one of the path and the range of time values, wherein the at least one of path and the range of time values are authenticated when obtained directly from a location processor at the user equipment, without allowing a change to the at least one of the path and the range of time values by a user of the user equipment;

providing the authenticated at least one of the path and the range of time values to a lost and found server including a database searchable based on at least the authenticated at least one of the path and the range of time values; and receiving, at the user equipment, an indication sent by the lost and found server, the indication representative of whether the database includes one or more lost and found items matching the at least one of the path and the range of time values.

6. The non-transitory computer-readable medium of claim 5, wherein the tracking is enabled based on an indication granting permission to track the plurality of locations.

7. The non-transitory computer-readable medium of claim 5, wherein the plurality of locations is received from at least one of a location service or the location processor at the user equipment.

8. The non-transitory computer-readable medium of claim 5, wherein the authenticating further comprises:

obtaining the plurality of locations automatically from the location processor at the user equipment, without allowing a change to the plurality of locations by a user of the user equipment.

9. A system comprising:

at least one processor; and at least one memory including code which when executed by at least one processor provides operations comprising:

tracking, by a user equipment, a plurality of locations of the user equipment, the plurality of locations mapped to a plurality of time values representative of when the user equipment traversed the plurality of locations;

determining, by the user equipment, a path comprising the plurality of locations of the user equipment, wherein the determining is based on a range of time values received from a user interface, wherein the range of time values represent an estimated range of times of when an item was lost;

authenticating, by the user equipment, at least one of the path and the range of time values, wherein the at least one of path and the range of time values are authenticated when obtained directly from a location processor at the user equipment, without allowing a change to the at least one of the path and the range of time values by a user of the user equipment;

providing the authenticated at least one of the path and the range of time values to a lost and found server including a database searchable based on at least the authenticated at least one of the path and the range of time values; and receiving, at the user equipment, an indication sent by the lost and found server, the indication representative of whether the database includes one or more lost and found items matching the at least one of the path and the range of time values.

10. The system of claim 9, wherein the tracking is enabled based on an indication granting permission to track the plurality of locations.

11. The system of claim 9, wherein the plurality of locations is received from at least one of a location service or the location processor at the user equipment.

12. The system of claim 9, wherein the authenticating further comprises:

obtaining the plurality of locations automatically from the location processor at the user equipment, without allowing a change to the plurality of locations by a user of the user equipment.

\* \* \* \* \*